(12) United States Patent
Worrall

(10) Patent No.: US 9,979,518 B2
(45) Date of Patent: May 22, 2018

(54) DUAL CONNECTIVITY

(71) Applicant: Alcatel Lucent, Boulogne Billancourt (FR)

(72) Inventor: Chandrika K. Worrall, Newbury (GB)

(73) Assignee: Alcatel Lucent, Boulogne-Billancourt (FR)

(*) Notice: Subject to any disclaimer, the term of this patent is extended or adjusted under 35 U.S.C. 154(b) by 0 days. days.

(21) Appl. No.: 14/890,268

(22) PCT Filed: Mar. 12, 2014

(86) PCT No.: PCT/EP2014/000665
§ 371 (c)(1),
(2) Date: Nov. 10, 2015

(87) PCT Pub. No.: WO2014/183816
PCT Pub. Date: Nov. 20, 2014

(65) Prior Publication Data
US 2016/0112164 A1    Apr. 21, 2016

(30) Foreign Application Priority Data
May 10, 2013    (EP) .................................... 13305598

(51) Int. Cl.
*H04W 4/00*        (2009.01)
*H04L 5/00*        (2006.01)
(Continued)

(52) U.S. Cl.
CPC .......... *H04L 5/0032* (2013.01); *H04L 5/0094* (2013.01); *H04W 36/0077* (2013.01);
(Continued)

(58) Field of Classification Search
CPC ... H04L 5/0032; H04L 5/0094; H04L 5/0005; H04W 36/0077; H04W 72/042;
(Continued)

(56) References Cited

U.S. PATENT DOCUMENTS

2013/0083695 A1    4/2013   Narasimha et al.
2014/0204771 A1*   7/2014   Gao ...................... H04W 36/28
                                                         370/252
(Continued)

FOREIGN PATENT DOCUMENTS

| CN | 102595533 A | 7/2012 |
| CN | 102595631 A | 7/2012 |

(Continued)

OTHER PUBLICATIONS

NTT Docomo, Inc., "New Study Item Description: Small Cell enhancements for E-UTRA and E-UTRAN—Higher-layer aspects," 3GPP TSG-RAN Meeting #58, Barcelona, Spain, Dec. 4-7, 2012, RP-122033, Document for: Approval, Agenda Item: 13.2, 5 pages.

(Continued)

*Primary Examiner* — Clemence Han
(74) *Attorney, Agent, or Firm* — Fay Sharpe, LLP

(57) ABSTRACT

A method of configuring a network node in a wireless telecommunications network to use a secondary cell for dual connectivity communication, a computer program product and network control node operable to perform that method. The method comprises: determining at least one RACH preamble reserved by the secondary cell for use by dual connectivity capable user equipment; identifying user equipment meeting criteria for implementation of dual connectivity communication with the secondary cell; and communicating an allocation of the at least one RACH preamble reserved by the secondary cell for use by dual connectivity capable user equipment to the identified user equipment. Aspects may avoid or mitigate contention experienced by user equipment on RACH and thus may enable fast, contention-free access to a cell. According to some aspects and embodiments, a dedicated preamble can be configured for user equipment identified as a candidate suited to implementation of dual connectivity techniques. Use of a dedi- (Continued)

cated preamble may, according to some embodiments, both avoid possible contention and also be used, in some embodiments, as a means to identify user equipment by a newly accessed cell, for example, in the case of RRC connected user equipment.

19 Claims, 4 Drawing Sheets

(51) Int. Cl.
| | |
|---|---|
| H04W 74/00 | (2009.01) |
| H04W 52/02 | (2009.01) |
| H04W 72/04 | (2009.01) |
| H04W 76/02 | (2009.01) |
| H04W 36/00 | (2009.01) |
| H04W 74/08 | (2009.01) |
| H04W 84/04 | (2009.01) |
| H04W 36/22 | (2009.01) |
| H04W 36/04 | (2009.01) |

(52) U.S. Cl.
CPC ..... *H04W 52/0206* (2013.01); *H04W 72/042* (2013.01); *H04W 72/048* (2013.01); *H04W 74/006* (2013.01); *H04W 76/025* (2013.01); H04L 5/0005 (2013.01); H04W 36/04 (2013.01); H04W 36/22 (2013.01); H04W 74/0833 (2013.01); H04W 84/045 (2013.01); Y02B 60/50 (2013.01)

(58) Field of Classification Search
CPC ............. H04W 76/025; H04W 72/048; H04W 52/0206; H04W 74/006; H04W 36/04; H04W 36/22; H04W 84/045; H04W 74/0833; Y02B 60/50
See application file for complete search history.

(56) References Cited

U.S. PATENT DOCUMENTS

| | | | | |
|---|---|---|---|---|
| 2014/0226630 | A1* | 8/2014 | Comstock | H04W 16/14 370/331 |
| 2014/0241281 | A1* | 8/2014 | Wu | H04W 76/025 370/329 |
| 2015/0351139 | A1* | 12/2015 | Zhang | H04W 52/0251 370/329 |
| 2016/0021581 | A1* | 1/2016 | Deenoo | H04W 36/0055 370/331 |
| 2016/0192433 | A1* | 6/2016 | Deenoo | H04W 72/046 370/329 |

FOREIGN PATENT DOCUMENTS

| | | |
|---|---|---|
| EP | 2 557 850 A1 | 2/2013 |
| JP | 2012-70134 A | 4/2012 |
| JP | 2014-523199 A | 9/2014 |
| WO | WO 2013/049505 A1 | 4/2013 |

OTHER PUBLICATIONS

Ericsson et al., "Enhancing mobility robustness and offloading potential with RRC diversity," 3$^{rd}$ Generation Partnership Project (3GPP), 3GPP TSG-RAN WG2 #81bis, R2-131211, pp. 1-10, XP050699290, Chicago, USA, Apr. 15-19, 2013.
Pantech, "Analysis of the RLF in dual connectivity," 3$^{rd}$ Generation Partnership Project (3GPP), 3GPP TSG-RAN WG2 Meeting #81bis, R2-131100, pp. 1-5, XP050699421, Chicago, USA, Apr. 15-19, 2013.
International Search Report for PCT/EP2014/000665 dated May 19, 2014.
Huawei, Hisilicon, "Study of Solutions and Radio Protocol Architecture for Dual-Connectivity" 3GPP TSG-RAN WG2 Meeting #81bis, Chicago, USA, Apr. 15-19, 2013, R2-131164, Agenda Item: 7.2, Document for: Discussion and decision, 12 pages.
Sharp, "PCell vs. SCell with PUCCH for inter-eNB CA/CoMP", 3GPP TSG-RAN WG2#81bis, Chicago, USA, Apr. 5-19, 2013, R2-131165, Agenda Item: 7.2, Document for: Discussion and Decision, pp. 1-5.

* cited by examiner

Traditional UMTS Architecture

DUAL CONNECTIVITY

FIELD OF THE INVENTION

The invention relates to a method of configuring a network node in a wireless telecommunications network to use a secondary cell for dual connectivity communication; a computer program product and network control node operable to perform that method.

BACKGROUND

Wireless telecommunication systems are known. In such systems, mobile communication devices (for example, mobile telephones) are operable to communicate with base stations provided by network providers.

In known wireless telecommunication systems, radio coverage is provided to network connectable devices, such as mobile telephones, or wireless devices such as iPads or other similar tablets, within areas known as cells. A base station is located in each cell to provide radio coverage. Typically, network connectable devices in each cell are operable to receive information and data from a base station and to transmit information and data to a base station.

User equipment roam through a wireless communications system. Base stations are typically provided which support areas of radio coverage. A number of such base stations are provided and are distributed geographically in order to provide a wide area of coverage to user equipment.

When user equipment is within an area served by a base station, communications may be established between the user equipment and the base station over associated radio links. Each base station typically supports a number of sectors within the geographical area of service. Typically, a different antenna within a base station supports each associated sector. Each base station has multiple antennas.

Traditional base stations provide coverage in relatively large geographical areas and those cells are often referred to as macro cells. It is possible to provide a heterogeneous network (hetnet) where smaller sized cells are provided within macro cells. Such smaller sized cells are sometimes referred to as micro cells, pico cells or femto cells. One way to establish a small cell is to provide a small cell base station that provides coverage having a relatively limited range within the coverage area of the macro cell. The transmission power of a small cell base station is relatively low and, hence, each small cell provides a small coverage area compared to that of a macro cell and covers, for example, an office or a home.

Such small cells are typically provided where the communications coverage provided by the macro cell is poor or where a user wishes to use an alternative communications link provided locally, by the small cell base station, to communicate with the core network, and/or to increase capacity within a network.

Deployment of small cells in a wireless communication network can assist a network in relation to handling capacity in high traffic areas, for example, so-called hot spot areas. An ability to offload traffic to a small cell or cells located in a high traffic area of a network may be particularly useful to a network operator. In some cases, "dual connectivity" may be offered such that a user and a network are configured to allow communication with a macro cell base station and a small cell base station. A number of dual connectivity implementations can be configured, each may offer different benefits.

Although dual connectivity HetNet deployments may offer advantages, unexpected consequences of such deployments may occur. It is desired to address those consequences.

SUMMARY

A first aspect provides a method of configuring a network node in a wireless telecommunications network to use a secondary cell for dual connectivity communication, the method comprising: determining at least one RACH preamble reserved by the secondary cell for use by dual connectivity capable user equipment; identifying user equipment meeting criteria for implementation of dual connectivity communication with the secondary cell; and communicating an allocation of the at least one RACH preamble reserved by the secondary cell for use by dual connectivity capable user equipment to the identified user equipment.

The first aspect recognizes that dual connectivity offers a way to offload data traffic in a network to a secondary cell, which may be a small cell, as required. In a dual connectivity scenario, user equipment is connected to more than one cell at a given time and the user equipment is served by a secondary cell in addition to a primary serving cell.

In a typical network deployment, backhaul communication between base stations serving user equipment, for example, between small cell base stations or between small cell base stations and macrocell base stations is non-ideal. That is to say, rather than offering immediate communication, there may be one way latency in the order of a few milliseconds to a few tens of milliseconds. In order for base stations, for example, a small cell and macro base station, to operate in a network to provide dual connectivity functionality with such backhaul latency, configuration and activation implementation must be considered in detail.

Traffic offloading may occur in relation to both downlink and uplink traffic in a network.

When a network identifies that dual connectivity techniques may be of use to perform traffic offloading in relation to particular user equipment, the network may be operable to configure a dual connectivity mode of operation at an appropriately identified base station supporting an additional cell for use by that user equipment. The additional or "secondary" cell may, for example, comprise a small cell.

In general, when user equipment wishes to establish communication with a base station, for example, a small cell, it is operable to initiate access by means of a Random Access Channel (RACH). RACH procedures are used by user equipment to gain uplink synchronization to a cell prior to establishment of communication with that cell.

User equipment generally accesses a cell by transmitting a RACH preamble randomly selected from a pool of known RACH preambles. The user equipment selects one of the preambles from the pool. User equipment is in contention for a RACH on which resource can be allocated by a base station. In other words, initiation of RACH processes results in contention between users. Contention and allocation of resource to a user results in a delay when trying to establish communication.

If user equipment is to use dual connectivity techniques effectively, minimizing delay when connecting to a secondary cell can be beneficial.

Furthermore, it may be beneficial for a secondary cell to be aware, from the outset, that user equipment wishing to acquire a connection is one which is a candidate for dual connectivity communication techniques. Due to latency associated with a non-ideal backhaul link, even if a primary cell takes steps to inform a secondary cell of the identity of user equipment which is a candidate for dual connectivity techniques, a secondary cell may be unaware of that identity when user equipment attempts connection via RACH, since the identity of user equipment is not established at the outset of a RACH process. It is, of course, possible to enforce a connection request delay at user equipment, to accommodate such backhaul latency, but completion of successful access by a dual connectivity candidate user may, as a result of such an enforced delay, take a long time.

Aspects recognize that offloading traffic using dual connectivity techniques may offer improved overall network operation if it is possible to implement such techniques quickly, to take advantage of, for example, user equipment passing through a region of radio coverage (cell) supported by a small cell base station. Aspects recognize that it may be possible to implement dual connectivity techniques in such a way that user equipment can mitigate a delay associated with RACH procedures in which contention is likely to be encountered.

Aspects may avoid or mitigate contention experienced by user equipment on RACH and thus may enable fast, contention-free access to a cell. According to some aspects and embodiments, a dedicated preamble can be configured for user equipment identified as a candidate suited to implementation of dual connectivity techniques. Use of a dedicated preamble may, according to some embodiments, both avoid possible contention and also be used, in some embodiments, as a means to identify user equipment by a newly accessed cell, for example, in the case of RRC connected user equipment.

The first aspect recognizes that each cell in a dual connectivity network may "reserve" a set of RACH preambles for use by user equipment operating to implement dual connectivity techniques. That reservation of preambles may be propagated through the network such that adjacent cells, which are likely to be candidates for dual connectivity arrangements using the cell as a secondary cell, are aware of the preamble reservations associated with each cell. When a primary cell identifies that a user meets threshold criteria for implementation of dual connectivity techniques, the primary cell can allocate the user an appropriate RACH preamble to be used when attempting to access a cell as a secondary cell. The secondary cell will be operable to identify a user making an access request using a reserved preamble as a dual connectivity candidate.

In one embodiment, the network node comprises user equipment. Accordingly, the method configures user equipment to make an access request to a secondary cell using an allocated preamble, that preamble having been reserved by a secondary cell for use in dual connectivity methods.

In one embodiment, the network node comprises a base station supporting the secondary cell for dual connectivity communication. Accordingly, the method configures a base station supporting a secondary cell to expect a connection request using a reserved RACH preamble.

In one embodiment, the method comprises communicating an indication of the allocation of the at least one RACH preamble reserved by the secondary cell for use by dual connectivity capable user equipment to the identified user equipment to the base station supporting the secondary cell. Accordingly, the secondary cell supporting base station may be made aware of the allocation of a reserved preamble to user equipment. The secondary cell may, in some embodiments, receive an indication of user equipment identity associated with an allocated preamble.

In one embodiment, communication of an allocation of the at least one RACH preamble reserved by the secondary cell comprises an indication of one or more of: preamble ID, time resource for transmission, frequency resource for transmission, serving cell-specific identity of the user equipment meeting criteria for implementation of dual connectivity communication with the secondary cell. Accordingly, various information may be included in messaging sent to either or both of the user equipment and base station supporting the secondary cell. By providing an indication of primary cell-specific user identity, it may be possible to identify a connecting user at a secondary cell more rapidly. Similarly, in some embodiments, a cell specific temporary identity may be associated with an allocated preamble. Alternatively, a cell may choose sub-sets of RACH preambles for allocation of dual connectivity with each possible primary cell, such that choice of a RACH preamble itself indicates a source primary cell.

In one embodiment, communication of an allocation of the at least one RACH preamble reserved by the secondary cell comprises an indication of a delay to be applied by the user equipment meeting criteria for implementation of dual connectivity communication with the secondary cell, before attempting connection to the secondary cell. Accordingly, by enforcing a delay, account may be taken of a non-ideal backhaul link between base stations supporting a primary and secondary cell to be used for dual connectivity.

In one embodiment, communication of an allocation of the at least one RACH preamble reserved by the secondary cell to the user equipment comprises transmission of the allocation to the user equipment in one of: a PDCCH message or RRC message.

In one embodiment, communication of an allocation to the user equipment of the at least one RACH preamble reserved by the secondary cell to the secondary cell comprises use of X2 signalling.

In one embodiment, the secondary cell is supported by a low power base station. The low power base station may support a small cell. The low power base station may support a metrocell, femto cell, micro cell, pico cell or similar.

In one embodiment, the method further comprises: identifying a dual connectivity profile to be used by the user equipment and communicating the dual connectivity profile to be implemented to the user equipment. Accordingly, having identified user equipment and configured it to use a cell as a secondary cell, the nature of the dual connectivity method to be implemented may be communicated to the user. For example, the secondary cell may be responsible for receiving all uplink traffic, or for transmission of selected downlink traffic. Communication of a dual connectivity profile to user equipment, and/or a base station supporting the secondary cell can allow suitable reconfiguration preparations to be made.

In one embodiment, the method further comprises: transmitting an indication to the user equipment to activate dual connectivity techniques in accordance with the identified dual connectivity profile. Accordingly, after configuration has occurred using a reserved RACH preamble to access a secondary cell, a subsequent activation step may occur.

A second aspect provides a computer program product operable, when executed on a computer, to perform the method of the first aspect.

A third aspect provides a network control node operable to configure a further network node in a wireless telecommunications network to use a secondary cell for dual connectivity communication, the network control node comprising: determination logic operable to determine at least one RACH preamble reserved by the secondary cell for use by dual connectivity capable user equipment; identification logic operable to identify user equipment meeting criteria for implementation of dual connectivity communication with the secondary cell; and communication logic operable to communicate an allocation of the at least one RACH preamble reserved by the secondary cell for use by dual connectivity capable user equipment to the identified user equipment.

In one embodiment, the network control node comprises a base station supporting a serving cell of the user equipment.

In one embodiment, the further network node comprises user equipment.

In one embodiment, the further network node comprises a base station supporting the secondary cell for dual connectivity communication.

In one embodiment, the communication logic is further operable to communicate an indication of the allocation of the at least one RACH preamble reserved by the secondary cell for use by dual connectivity capable user equipment to the identified user equipment to the secondary cell.

In one embodiment, the communication of an allocation of the at least one RACH preamble reserved by the secondary cell comprises an indication of one or more of: preamble ID, time resource for transmission, frequency resource for transmission, serving cell-specific identity of the user equipment meeting criteria for implementation of dual connectivity communication with the secondary cell.

In one embodiment, the communication of an allocation of the at least one RACH preamble reserved by the secondary cell comprises an indication of a delay to be applied by the user equipment meeting criteria for implementation of dual connectivity communication with the secondary cell, before attempting connection to the secondary cell.

In one embodiment, the communication of an allocation of the at least one RACH preamble reserved by the secondary cell to said user equipment comprises transmission of the allocation to the user equipment in one of: a PDCCH message or RRC message.

In one embodiment, the communication of an allocation to the user equipment of the at least one RACH preamble reserved by the secondary cell to the secondary cell comprises use of X2 signalling.

In one embodiment, the secondary cell is supported by a low power base station.

In one embodiment, the network control node further comprises: dual connectivity profile logic operable to identify a dual connectivity profile to be used by the user equipment and communicate the dual connectivity profile to be implemented to the user equipment.

In one embodiment, dual connectivity profile logic is operable to transmit an indication to the user equipment to activate dual connectivity techniques in accordance with the identified dual connectivity profile.

A fourth aspect provides a method of configuring a network node in a wireless telecommunications network to use a cell as a secondary cell for dual connectivity communication, the method comprising: determining at least one RACH preamble reserved by the cell for use by dual connectivity capable user equipment; receiving an access request from user equipment using a RACH preamble reserved by the cell for use by dual connectivity capable user equipment; and allocating dual connectivity resource to the user equipment using the reserved RACH preamble. Accordingly, the reserved RACH preambles at each cell may be determined by the base station supporting that cell or may be selected by a control node in the network and communicated to the base station supporting the cell. Either way, an association between a cell and a set of RACH preambles to be used for dual connectivity may be made. The reserved preambles may comprise a plurality of sub-sets of RACH preambles, each selected or reserved in relation to a different primary cell-secondary cell dual connectivity pairing.

In one embodiment, the method comprises receiving an indication of the allocation of the at least one RACH preamble reserved by the secondary cell for use by dual connectivity capable user equipment to the identified user equipment from a primary cell serving the user equipment. Accordingly, once an allocation of a preamble has been made to a user, that allocation is communicated to the appropriate secondary cell.

In one embodiment, the indication of an allocation to the user equipment of the at least one RACH preamble from the serving cell is received on X2 signalling from the primary serving cell.

In one embodiment, the method comprises transmitting an indication of the least one RACH preamble reserved by the cell for use by dual connectivity capable user equipment to a network control node.

In one embodiment, the access request further comprises: an indication of one or more of: preamble ID, time resource for transmission, frequency resource for transmission, serving cell-specific identity of the user equipment meeting criteria for implementation of dual connectivity communication with the secondary cell.

A fifth aspect provides a computer program product operable, when executed on a computer, to perform the method of the fourth aspect.

A sixth aspect provides a base station operable to configure a cell in a wireless telecommunications network for use as a secondary cell for dual connectivity communication, the base station comprising: determination logic operable to determine at least one RACH preamble reserved by the cell for use by dual connectivity capable user equipment; reception logic operable to receive an access request from user equipment using a RACH preamble reserved by the cell for use by dual connectivity capable user equipment; and allocation logic operable to allocate dual connectivity resource to the user equipment using the reserved RACH preamble.

In one embodiment, the base station comprises a low power base station.

In one embodiment, the base station comprises reception logic operable to receive an indication of the allocation of the at least one RACH preamble reserved by the secondary cell for use by dual connectivity capable user equipment to the identified user equipment from a cell serving the user equipment.

In one embodiment, the indication of an allocation to the user equipment of the at least one RACH preamble from the serving cell is received on X2 signalling from the serving cell.

In one embodiment, the base station comprises configuration logic operable to transmit an indication of the least one RACH preamble reserved by the cell for use by dual connectivity capable user equipment to a network control node.

In one embodiment, the access request further comprises an indication of one or more of: preamble ID, time resource for transmission, frequency resource for transmission, serving cell-specific identity of said user equipment meeting criteria for implementation of dual connectivity communication with the secondary cell.

A seventh aspect provides a method of configuring user equipment in a wireless telecommunications network to use a secondary cell for dual connectivity communication, the method comprising: receiving an indication that the user equipment meets criteria for implementation of dual connectivity communication with a secondary cell; and receiving an allocation of a RACH preamble reserved by the secondary cell for use by dual connectivity capable user equipment; and requesting connection to the secondary cell using the allocated RACH preamble.

An eighth aspect provides a computer program product operable, when executed on a computer, to perform the method of the seventh aspect.

A ninth aspect provides user equipment operable to configure itself to use a secondary cell in a wireless telecommunications network for dual connectivity communication, the user equipment comprising: reception logic operable to receive an indication that the user equipment meets criteria for implementation of dual connectivity communication with the secondary cell; and preamble allocation reception logic operable to receive an allocation of a RACH preamble reserved by the secondary cell for use by dual connectivity capable user equipment; and connection logic operable to request connection to the secondary cell using the allocated RACH preamble.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
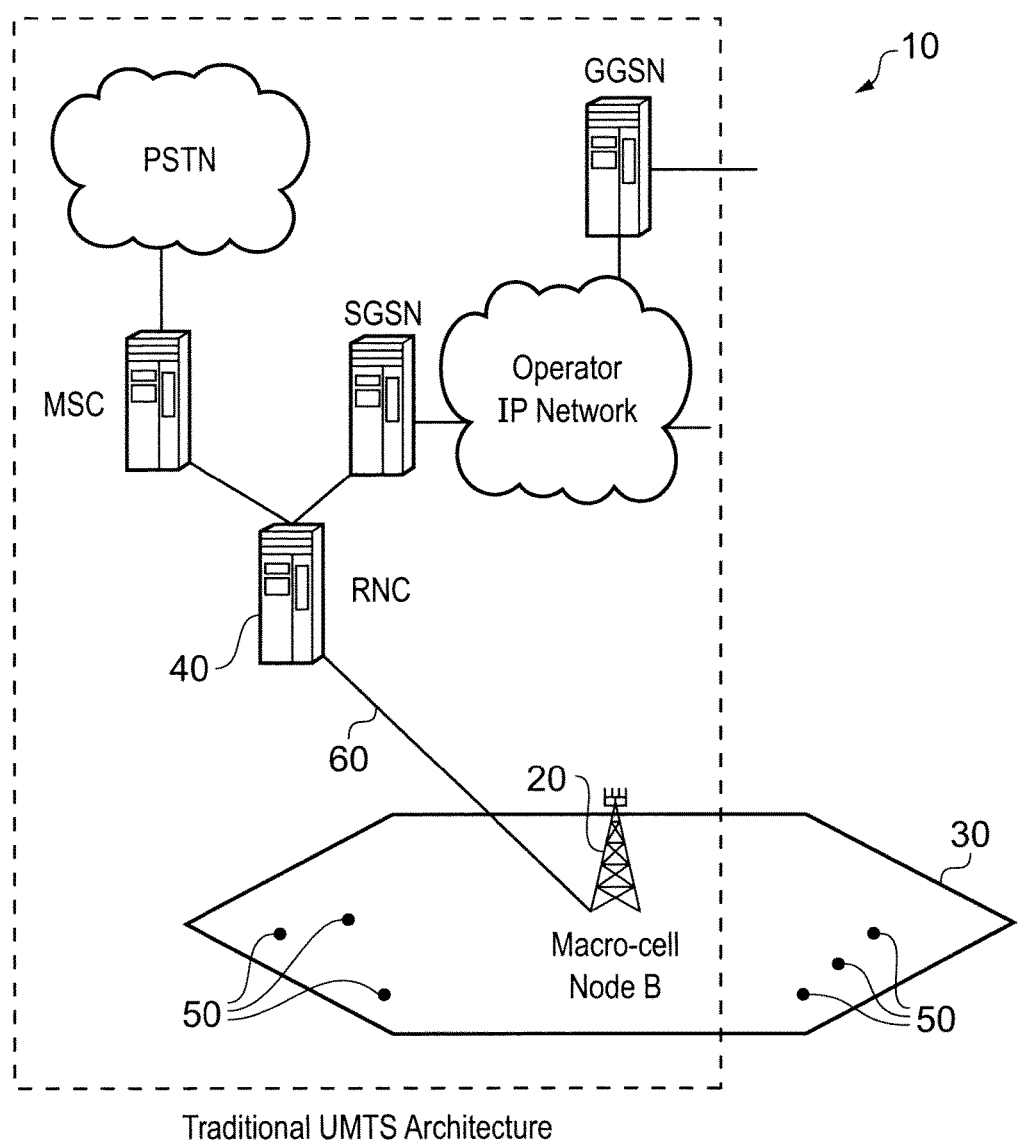
FIG. 1 illustrates the main components of an example telecommunications network.

FIG. 1 illustrates schematically the main components of a wireless telecommunications network 10. In the UMTS network architecture illustrated user equipment 50 roam through the wireless telecommunications system. Base stations 20 are provided which support areas of radio coverage 30. A number of such base stations 20 are provided and are distributed geographically in order to provide a wide area of coverage to user equipment 50.

When user equipment is within an area served by a base station 30, communications may be established between the user equipment and the base station over associated radio links. Each base station typically supports a number of sectors within the geographical area of service 30.

Typically, a different antenna within a base station supports each associated sector. Each base station 20 has multiple antennas. It will be appreciated that FIG. 1 illustrates a small subset of a total number of user equipment and base stations that may be present in a typical communication network. It will also be appreciated that different network architectures may be implemented, including, for example a Long Term Evolution (LTE) network in which the functionality provided by network nodes described above is provided by network nodes which are named differently but have analogous functionality.

Dual Connectivity

Dual Connectivity may be implemented in the downlink and/or the uplink. Offloading uplink traffic in a dual connectivity capable network can be implemented, for example, using one of the following configurations:

In one configuration, user equipment may be operable to transmit all uplink traffic to one cell, for example, the small cell. In a co-channel deployment with dual connectivity, the user equipment may have strong downlink signal from a macro cell, whilst having low path loss in relation to uplink transmissions directed towards the small cell. In such a scenario, all uplink traffic can be transmitted from user equipment to the small cell.

In another configuration in a co-channel deployment with dual connectivity, some uplink data flows (radio bearers) can be offloaded to a small cell.

In another configuration in a co-channel deployment with dual connectivity, uplink data can belong to a radio bearer which is scheduled and received by both macro and small cell, for example, in a network capable to implement multi flow or multi streaming techniques.

It will be appreciated that uplink and downlink traffic offload parameters may depend upon network policy and a particular deployment scenario.

A) In one scenario, the network policy may be to perform an uplink and downlink split such that downlink traffic is served by one cell and uplink traffic is served by another cell.

B) In another scenario, the network policy may be such that control plane traffic is served by one cell whilst user plane traffic is served by another, for example, a secondary cell.

C) In another scenario, traffic mapped to some radio bearers is served by one cell whilst other radio bearers are served by a secondary cell.

D) In another scenario, traffic mapped onto some radio bearers is served by more than one cell.

Overview

Before discussing the embodiments in any more detail, first an overview will be provided.

RACH Procedure

Contention-based and contention-free random access procedures within a 3GPP network are specified.

A contention based procedure has 4 steps:
Step 1: random access preamble transmission
Step 2: random access response
Step 3: scheduled transmission
Step 4: contention resolution A contention-free access procedure has three steps:
Step 0: dedicated preamble assignment
Step 1: preamble transmission
Step 2: random access response If a dedicated preamble is assigned by the same cell as the one user equipment performs a random access procedure in relation to, or if a dedicated preamble is assigned by a target cell and is communicated to a serving cell of a user via an ideal backhaul link, the target cell will typically be in a position to identify user equipment on reception of the dedicated RACH preamble.

In a handover scenario, a target cell assigns a dedicated preamble to user equipment and communicates that dedicated preamble to user equipment via a serving cell. It will be appreciated that, in a handover scenario, maintaining a connection between the network and user equipment is of importance and, as a result, exchange of dedicated preamble information may take place in a manner selected to ensure necessary exchange has occurred before completion of a handover. That is to say, handover may result in a long data plane interruption.

To take advantage of the architecture of a HetNet and make use of traffic offloading using dual connectivity techniques, aspects and embodiments described may achieve a lower data plane interruption than that experienced in relation to handover.

Dual Connectivity Network Configuration

Figure 2:
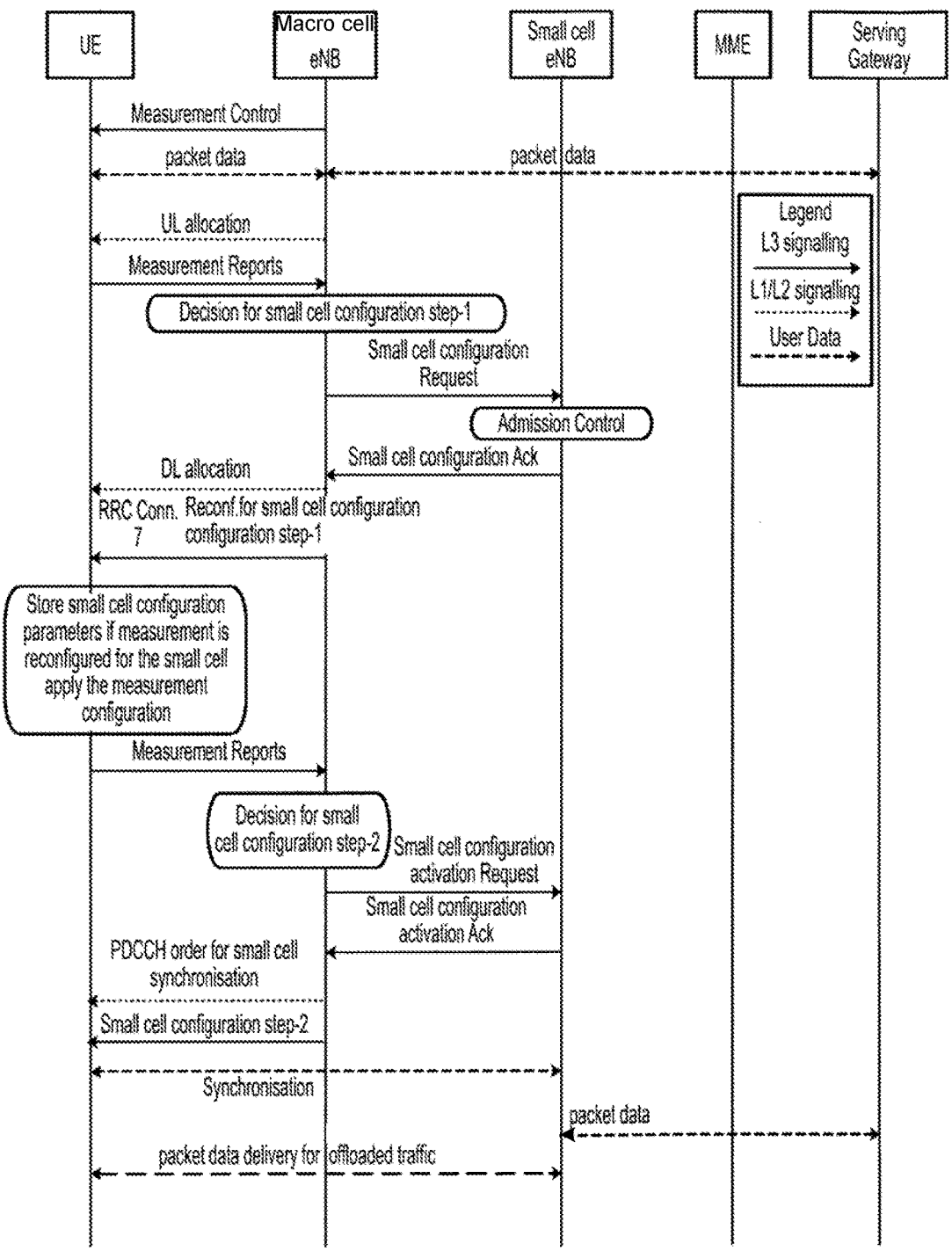
FIG. 2 is a network signalling diagram illustrating schematically one example of dual connectivity network configuration.

FIG. 2 is a network signalling diagram illustrating schematically one example of dual connectivity network configuration. It will be appreciated that nodes in a network, including, for example, base stations and user equipment, may be configured to implement dual connectivity techniques according to a range of possibilities. One possible procedure for configuration of, for example, a small cell, to operate to facilitate dual connectivity within a network comprises the following steps:

Based on measurement reports from user equipment and/or a small cell discovery report from a user, the network may be operable to configure an identified small cell for a user to be able to use that identified small cell for dual connectivity communication within the network. This may be the first step in a multi-cell configuration procedure. Parameters which could be provided during such a first step may comprise: cell id of a secondary cell (ie the cell identified as a candidate for data traffic offloading); secondary cell system information required for initial access to the secondary cell (for example, PRACH, cell barring info, and similar). The network may also provide information regarding selected traffic offloading parameters. Traffic offloading parameters provided at step 1 may indicate general network policy in a given deployment scenario:

A) According to one scenario, network policy can be to perform an uplink and downlink split such that downlink is served by one cell and uplink is served by another cell.

B) According to another scenario, control plane traffic is served by one cell whilst user plane traffic is served by a secondary cell.

C) According to another scenario, traffic mapped to some radio bearers is served by one cell whilst other radio bearers are served by a secondary cell.

D) According to a further scenario, traffic mapped onto some radio bearers is served by more than one cell.

In relation to scenarios A to C outlined above, network policy may depend upon network traffic characteristics. The network policy may be dynamic or static. In the case where the network policy is static, a chosen static policy relating to offloading configuration can be provided to a user in the first step, for example, at the same time as provision of a secondary cell addition. According to one example, the signaling involved in the first step is communicated between a first (macro) cell and a user via RRC signaling. RRC signaling may be used in relation to RRC connected users.

Once a user receives messaging in relation to the first configuration step set out above, the user may be operable to store configuration information encoded within the messaging. That configuration may be stored by the user equipment for later use. It will be appreciated that configuration of a user to perform using dual connectivity techniques within a network can be separate to activation of a user to implement dual connectivity. In a configuration stage, rather than a configuration and activation step, a user is not typically required to turn on a receiver or transmitter required for communication with the secondary cell.

During the first step of configuration, a user may be configured by the network to implement more aggressive measurement reports in relation to the configured secondary cell. If any parameters provided to a user in the first step are changed by the network, the network may operate to update the user and provide up-to-date parameters. RRC signaling transmitted from the first cell can be used for such update signaling to a user.

In one example, during the first configuration step a serving cell, for example, macro cell, may be operable to communicate with a secondary cell, for example, a small cell. The small cell is made aware of user equipment configuration and preparation for possible communication of user traffic via the small cell is performed. Radio bearer configuration is determined or negotiated between the two cells. Call admission control for any radio bearers offloaded to the small cell may also be performed. According to some aspects and embodiments, one or more dedicated RACH preambles can be reserved for use by a dual connectivity user or group of users.

A second configuration step can performed by a network based on, for example, a measured network load. That network load may comprise: current serving cell load or secondary cell load. The second configuration step may be performed in response to an indication received from the core network, and/or a measurement report from a user, for example, indicative of signaling quality to and/or from a secondary cell.

The second step of configuration comprises an activation phase. The activation phase is performed in response to a trigger and the activation phase is such that user equipment is operable to prepare a receiver and/or transmitter for dual connectivity communication with the secondary cell. During the secondary configuration step, user equipment is operable to obtain downlink synchronization with the secondary cell. During the secondary configuration step the user equipment is also operable to perform uplink synchronization procedures by means of transmission of a RACH preamble towards the secondary cell. In accordance with some aspects and embodiments, in order to allow for fast access, a dedicated RACH preamble is provided to user equipment. That dedicated preamble may typically be provided in the early stages of the second configuration step. The dedicated RACH preamble could be provided to user equipment via, for example, a PDCCH order and include a Secondary cell ID or via dedicated RRC signaling. Upon completion of successful RACH access and UL synchronization, the user equipment may be operable to apply previously configured and stored secondary cell configuration parameters in relation to communication with the secondary cell.

Aspects and embodiments may provide a method for fast RACH access to a secondary cell by means of a RACH preamble provided by a serving cell.

Aspects and embodiments may allow a "secondary" cell, for example, a small cell, to be configured for a dual connectivity candidate user in advance of a need to activate dual connectivity communication. As a result of pre-configuration of a secondary cell, for example, a small cell, user equipment may request access to the secondary cell at the time it is required. Such an arrangement may result in a saving to available user equipment battery power.

Aspects and embodiments may provide for a contention-free access procedure to enable fast access to a secondary cell. That secondary cell may, for example, comprise a small cell. In some embodiments, a small cell is operable to allocate a group of dedicated preambles to be used in relation to user equipment identified as dual connectivity candidates. In some embodiments, a macro cell is informed of a reserved group of dedicated preambles by each small cell. That information may be communicated to the macro cell in advance, for example, during cell configuration.

In some embodiments a serving, or primary, cell, for example, a macro eNB, is operable to allocate a dedicated preamble from a group of dedicated preambles to candidate dual connectivity user equipment. That is to say, if a secondary cell is identified by user equipment as being suited to establishment of dual connectivity communication techniques, a primary cell serving that user may select a dedicated preamble from the group allocated by the identified secondary cell and allocate that dedicated preamble to the user equipment.

Allocation of a dedicated preamble may be communicated to a secondary cell, for example, a small cell, so that it can expect arrival or configuration in relation to user equipment. That communication may occur, for example, via X2 signaling between base stations within a network, or communication may be achieved by modification of RACH procedure such that user equipment is operable to communicate a user equipment cell-identity (C-RNTI) to a secondary cell, for example, small cell, as part of the random access procedure.

Preamble Configuration

Figure 3:
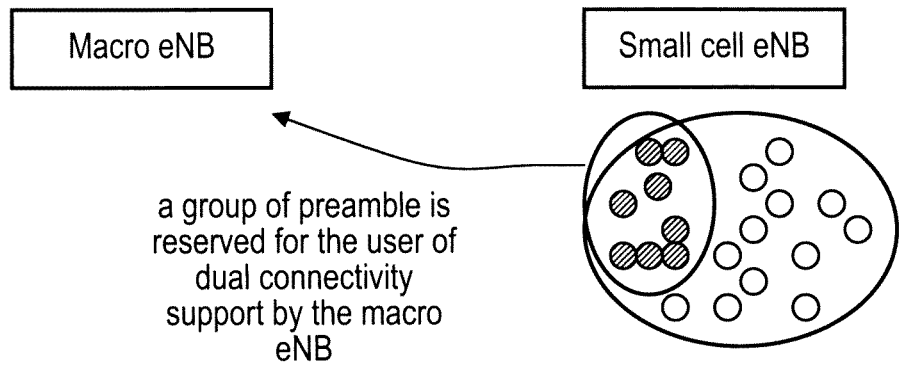
FIG. 3 illustrates schematically preamble configuration according to some aspects and embodiments.

FIG. 3 illustrates schematically preamble configuration according to some aspects and embodiments. According to some embodiments a macro eNB and small cell NB are operable to communicate and determine reserved preamble(s) to be used in support of dual connectivity techniques. That sharing of identified dedicated preambles may occur, in some embodiments, during the cell setup procedure. In some embodiments, the decision may be signalled by a small cell to a macrocell upon identification, by a network, that dual connectivity may be of use in relation to one or more users. Such semi-static configuration information may be communicated between base stations using X2 signalling. In some embodiments it is possible to configure reserved preamble resources via O&M. The dedicated preamble resources may comprise: one or more preamble IDs and/or time and frequency resources intended to be used for transmission.

Figure 4:
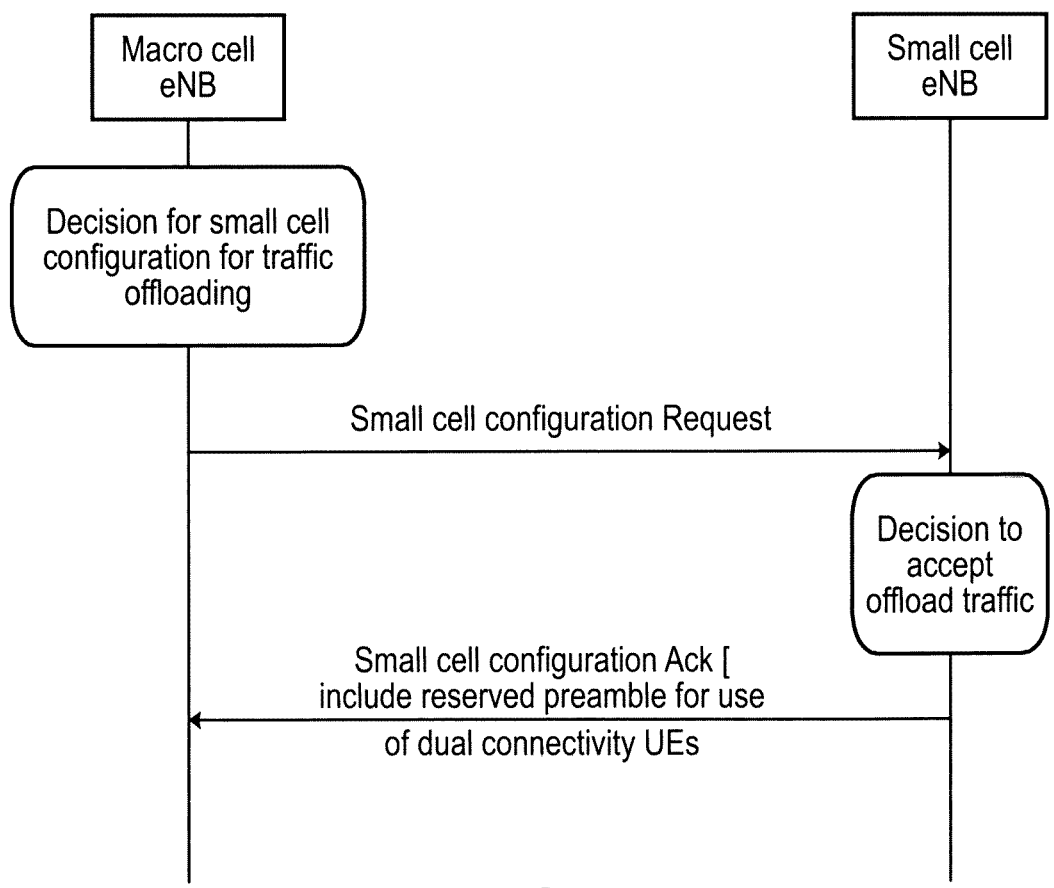
FIG. 4 illustrates schematically network signalling according to one embodiment.

FIG. 4 illustrates schematically network signalling according to one embodiment. In the embodiment shown, the network signalling flow between a macro cell and small cell base station occurs using X2 signalling. If a macro network makes a decision, based on network policy, to offload traffic for one or more user equipment, the user equipment can be configured to use a dedicated preamble for access to the small cell. According to aspects and embodiments, user equipment is then operable to use an allocated dedicated preamble for small cell access. Since the macro eNB can only allocate a particular preamble to one user equipment, small cell access is contention-free for that user.

Figure 5:
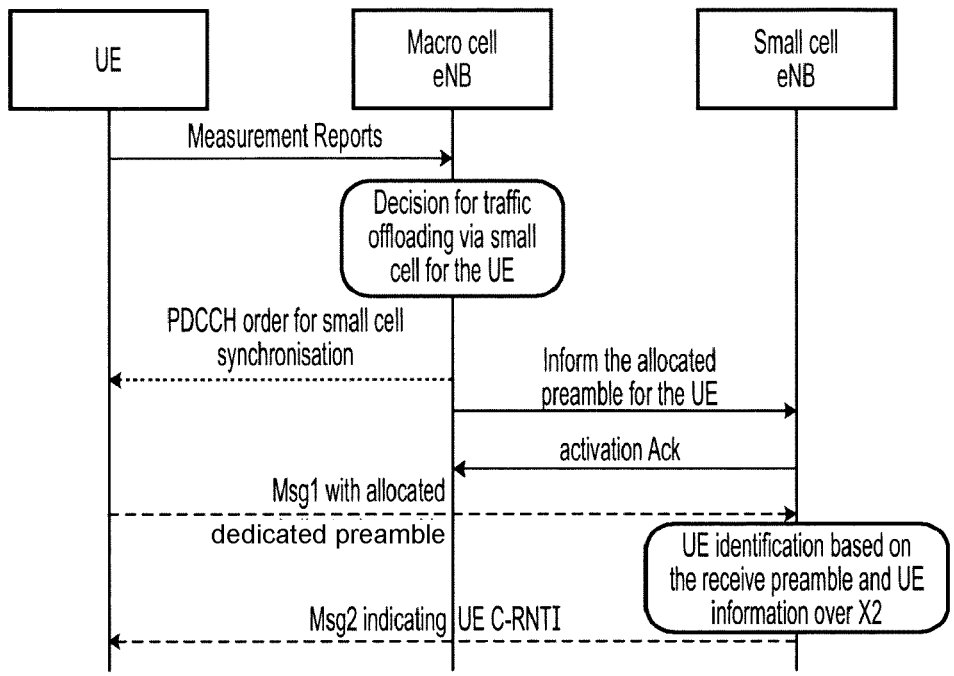
FIG. 5 illustrates schematically network signalling according to one embodiment.

FIG. 5 illustrates schematically network signalling according to one embodiment. According to some embodiments, a macro cell may be operable to inform user equipment of an allocated dedicated preamble together with, for example, UE identification such as C-RNTI. That information may also be communicated to a small cell over the X2 interface. The signalling flow for this embodiment is shown schematically in FIG. 5. In the example illustrated a PDCCH order is used when requesting a user access the small cell with an allocated preamble. In alternative embodiments, the dedicated preamble information may be conveyed to the UE via RRC messaging, for example, an RRC connection reconfiguration message requesting the user equipment access (dual connection) to an identified small cell.

Figure 6:
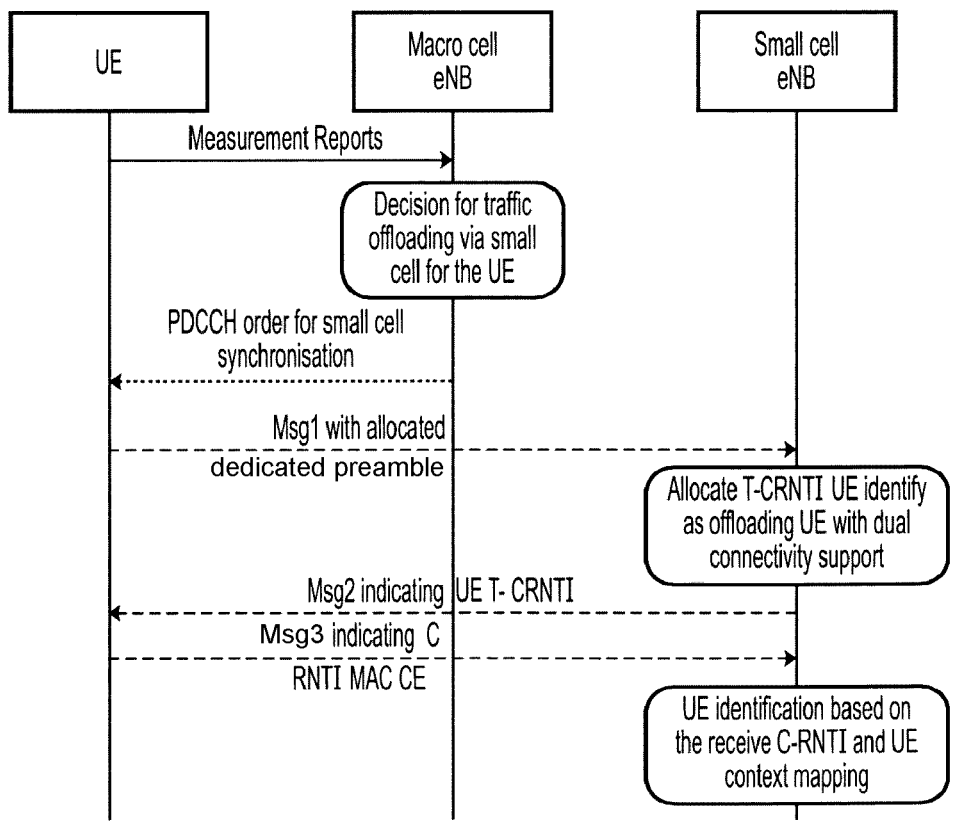
FIG. 6 illustrates schematically network signalling according to one embodiment

FIG. 6 illustrates schematically network signalling according to one embodiment. According to the embodiment illustrated in FIG. 6 a small cell is not informed of allocation of a dedicated preamble to a user. The user may be operable to access the small cell using the allocated dedicated preamble (msg1) and, in return, receive a resource allocation response allocating T-CRNTI for the corresponding preamble (msg 2). The user equipment may be operable to transmit an indication of UE identity, such as C-RNTI (msg 3). Upon reception of msg 3, a small cell can fully identify the user equipment and the UE context can be mapped.

Aspects and embodiments may provide a method for contention-free random access by dual connectivity configured user equipment to access a secondary cell. Aspects and embodiments may support a fast access method in a practical deployment in which primary and secondary base stations are connected via a non-ideal backhaul with large latency.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention.

Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A method of configuring a network node in a wireless telecommunications network to use a secondary cell for dual connectivity communication, said method comprising:
   determining at least one reserved RACH preamble signaled to said network node by said secondary cell for use by dual connectivity capable user equipment;
   identifying user equipment meeting criteria for implementation of dual connectivity communication with said secondary cell; and
   communicating an allocation of said at least one reserved RACH preamble for use by dual connectivity capable user equipment to said identified user equipment.

2. A method according to claim 1, further comprising: communicating to said second cell an indication of said allocation to said identified user equipment of said at least one reserved RACH preamble reserved by said secondary cell for use by dual connectivity capable user equipment to said identified user equipment to said secondary cell.

3. A method according to claim 1, wherein said communication of an allocation of said at least one reserved RACH preamble comprises an indication of one or more of: preamble ID, time resource for transmission, frequency resource for transmission, serving cell-specific identity of said user equipment meeting criteria for implementation of dual connectivity communication with said secondary cell.

4. A method according to claim 1, wherein said communication of an allocation of said at least one reserved RACH preamble comprises an indication of a delay to be applied by said user equipment meeting criteria for implementation of dual connectivity communication with said secondary cell, before attempting connection to said secondary cell.

5. A method according to claim 1, wherein said communication of an allocation of said at least one reserved RACH preamble to said user equipment comprises transmission of said allocation to said user equipment in one of: a PDCCH message or RRC message.

6. A method according to claim 1, wherein communication to said secondary cell of an allocation to said user equipment of said at least one reserved RACH preamble comprises use of X2 signalling.

7. A method according to claim 1, wherein said secondary cell is supported by a low power base station.

8. A method according to claim 1, wherein said method further comprises: identifying a dual connectivity profile to be used by said user equipment and communicating said dual connectivity profile to be implemented to said user equipment.

9. A method according to claim 8, wherein said method further comprises: transmitting an indication to said user equipment to activate dual connectivity techniques in accordance with said identified dual connectivity profile.

10. A computer program product comprising a non-transitory computer-readable medium having stored thereon instructions that, when executed on a computer, to perform the method of claim 1.

11. The method according to claim 1, comprising transmitting a secondary cell configuration request towards said secondary cell, said reserved RACH preamble being received from said secondary cell in response to said secondary cell configuration request.

12. The method according cl claim 1, wherein said reserved RACH preamble is one of a group of preambles reserved for dual connectivity by said secondary cell.

13. A network control node operable to configure a further network node in a wireless telecommunications network to use a secondary cell for dual connectivity communication, said network control node comprising:
   one or more processors configured to:
      be made aware of at least one reserved RACH preamble signaled to said further network node by said secondary cell for use by dual connectivity capable user equipment;
      identify user equipment meeting criteria for implementation of dual connectivity communication with said secondary cell; and
      communicate an allocation of said at least one reserved RACH preamble for use by dual connectivity capable user equipment to said identified user equipment.

14. A method of configuring a network node in a wireless telecommunications network to use a cell as a secondary cell for dual connectivity communication, said method comprising:
   determining at least one reserved RACH preamble signaled to said network node for use by dual connectivity capable user equipment;
   receiving an access request from user equipment using said reserved RACH preamble; and
   allocating dual connectivity resource to said user equipment using said reserved RACH preamble.

15. The method according to claim 14, comprising a further step of transmitting a secondary cell configuration request towards said secondary cell, said reserved RACH preamble being received in response to said transmitting step.

16. A base station operable to configure a cell in a wireless telecommunications network for use as a secondary cell for dual connectivity communication, said base station comprising:
   one or more processors configured to:
      be made aware of at least one reserved RACH preamble signaled to said base station by said cell for use by dual connectivity capable user equipment;
      receive an access request from user equipment using said reserved RACH preamble; and
      allocate dual connectivity resource to said user equipment using said reserved RACH preamble.

17. The base station according to claim 16, further comprising a transmitter for transmitting a secondary cell configuration request towards said secondary cell and a receiver for receiving said reserved RACH preamble in response to said configuration request.

18. A method of configuring user equipment in a wireless telecommunications network to use a secondary cell for dual connectivity communication, said method comprising:
- receiving an indication that said user equipment meets criteria for implementation of dual connectivity communication with said secondary cell; and
- receiving an allocation of a reserved RACH preamble signaled to a network node by said secondary cell for use by dual connectivity capable user equipment; and
- requesting connection to said secondary cell using said allocated RACH preamble.

19. User equipment operable to configure itself to use a secondary cell in a wireless telecommunications network for dual connectivity communication, said user equipment comprising:
- one or more processors configured to:
- receive an indication that said user equipment meets criteria for implementation of dual connectivity communication with said secondary cell; and
- receive an allocation of a reserved RACH preamble signaled to said network node by said secondary cell for use by dual connectivity capable user equipment; and
- request connection to said secondary cell using said allocated RACH preamble.

* * * * *